Aug. 7, 1945.   G. A. ILER   2,381,287
VALVE
Filed July 18, 1939

Inventor.
George A. Iler.
by Parker & Carter
Attorneys.

Patented Aug. 7, 1945

2,381,287

UNITED STATES PATENT OFFICE 2,381,287

VALVE

George A. Iler, Riverside, Ill., assignor, by mesne assignments, to General Finance Corporation, Chicago, Ill., a corporation of Michigan Application July 18, 1939, Serial No. 285,122

5 Claims. (Cl. 251—119)

This invention relates to improvements in valves and has for its object to provide a new and improved device of this description.

The invention has as a further object to provide a valve which also acts as a check valve. The invention has as a further object to provide a diaphragm valve which in addition to acting as a valve through which fluids flow, acts also as a check valve for cutting off the flow of the fluid.

The invention has further objects which are more particularly pointed out in the accompanying description.

Referring now to the drawing, Fig. 1 is a view showing one form of valve embodying the invention;

Like numerals refer to like parts throughout the several figures.

Figure 1:
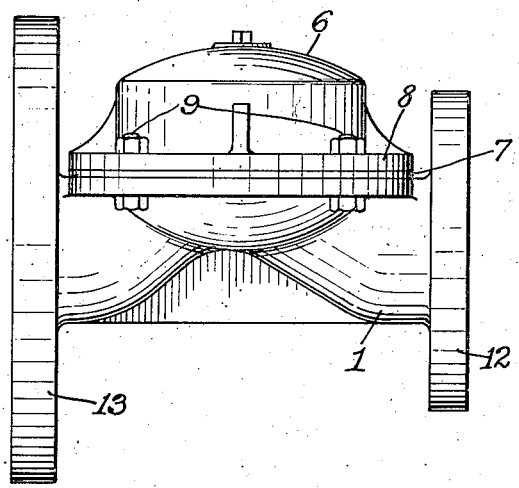
Figure 3:
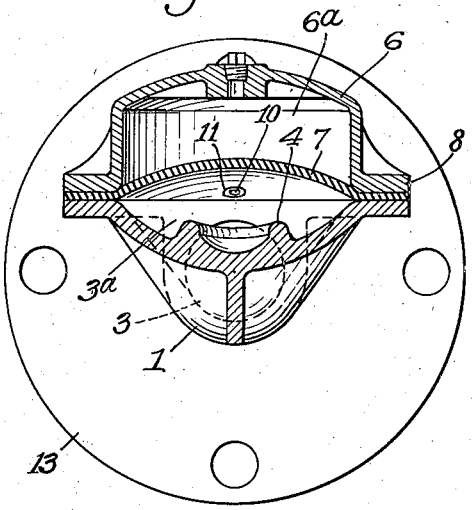
Fig. 3 is a cross section through the valve.
Figure 2:
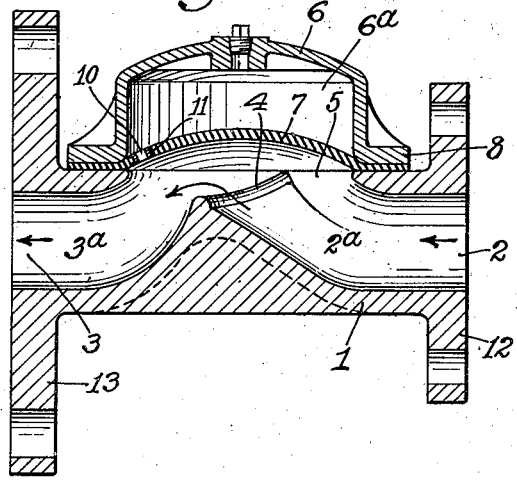
Fig. 2 is a longitudinal section through the valve.

The drawing shows one form of valve embodying the invention. In the construction as shown in the drawing, the valve comprises a casing 1 having a passageway therethrough with an inlet 2 and an outlet 3. Extending across the passageway intermediate its ends is a wall 4 which acts as the valve seat. The passageway has a portion 2a on one side of this wall and another portion 3a on the other side of this wall. The casing is provided with an opening 5 opposite this wall. There is a cover 6 for the casing which extends over the opening 5 and which has a fluid receiving chamber 6a. A flexible diaphragm 7 extends over the opening 5, and the casing and diaphragm are fastened in position in any desired manner. As herein shown, the casing is provided with a flange 8 and the edge of the diaphragm is between this flange and the portion of the casing surrounding the opening 5. The top of the wall 4 acts as the seat for the diaphragm and when the diaphragm is moved into contact with this seat, the valve is closed, and when the diaphragm moves away from the seat, the valve is opened. The cover and the diaphragm are held in position by the fastening devices 9 which extend through the flange 8, the diaphragm 7 and the casing 1. The diaphragm is provided with one or more openings 10. These openings are preferably provided with a metal lining 11. The casing 1 is preferably provided with the flanges 12 and 13 by means of which the casing is connected in a suitable pipe line.

The use and operation of my invention are as follows.

When the parts are assembled and the fluid enters the inlet 2, the diaphragm 7 is moved away from its seat so as to open up the passageway and the fluid passes through the passageway to the point desired. A portion of the fluid passing through the passageway passes through the opening 10 into the fluid receiving chamber 6a above the diaphragm 7. The pressure of the fluid in the portion 2a of the passageway is greater than the pressure of the fluid in the portion 3a of the passageway under normal conditions, as the fluid flows through the casing from the inlet 2 to the outlet 3. Under these conditions, the pressure in the portion 2a of the passageway below the diaphragm is greater than the pressure in the fluid receiving chamber 6a above the diaphragm and the diaphragm is held open. If now the fluid starts to flow in a reverse direction through the casing, that is, from the outlet 3 toward the inlet 2, the pressure in the portion 3a of the passageway becomes greater than that in the portion 2a on the other side of the wall, and this, due to the openings 10, causes the pressure above the diaphragm 7 in the fluid receiving chamber 6a to become greater than the pressure below the diaphragm and causes the diaphragm to move to engage its seat and close off the reverse flow through the casing 1. If the conditions cause the fluid to move into the inlet 2 to direct the flow through the casing in the normal way, the pressure lifts the diaphragm 7 from its seat, so that the fluid can flow through the casing and be forced out.

It will be seen that this construction produces a valve which is exceedingly sensitive and which acts quickly to shut off any reverse flow through the valve and to quickly open up and permit the normal forward flow of the fluid through the valve.

It will further be seen that there is here provided a valve having a casing having a passageway therethrough with an inlet and an outlet, there being an opening intermediate the inlet and outlet, with a diaphragm extending thereacross, a seat for the diaphragm intermediate the inlet and outlet, a fluid receiving chamber, the diaphragm being between the fluid receiving chamber and the seat, and a fluid connection leading from a point downstream of the seat to the fluid receiving chamber.

I claim:

1. An automatic valve comprising a casing having a substantially continuous passageway extending in a generally continuous forward direction therethrough with an inlet and an outlet, an obstructing wall extending across said passageway between the inlet and the outlet, said casing having an opening above said wall, a flexible diaphragm extending across said opening, which engages said wall to close the passageway, a cover for said opening having a fluid receiving chamber above said diaphragm, said wall dividing said passageway into two sections below said diaphragm, an upstream section and a downstream section, and acting to increase the pressure in said upstream section and decrease the pressure in said downstream section when the fluid is flowing normally through the casing, and a passage through the diaphragm providing communication between the fluid receiving chamber above said diaphragm and the section of the passageway downstream of said wall, through which fluid passes into said fluid receiving chamber, the pressure in said downstream section being increased and the pressure in said upstream section being decreased when the fluid starts to flow in a reverse direction through the casing, so as to increase the pressure of the fluid in said fluid receiving chamber to automatically move the diaphragm against said wall to shut off the passage of fluid through the casing, said passage through said diaphragm being near the edge thereof and all of said wall being on one side of said passage.

2. An automatic valve comprising a casing having a substantially continuous passageway extending in a generally continuous forward direction therethrough with an inlet and an outlet, an obstructing wall extending across said passageway between the inlet and the outlet, said casing having an opening above said wall, a flexible diaphragm extending across said opening, which engages said wall to close said passageway, a cover for said opening having a fluid receiving chamber above said diaphragm, and a passage near the edge of said diaphragm and extending through said diaphragm between the passageway and the fluid receiving chamber, said passage being on the side of said wall nearest the outlet of the casing, so that the pressure in the fluid receiving chamber automatically moves the diaphragm to its closed position when the fluid starts to flow in a reverse direction through the casing.

3. An automatic valve comprising a casing having a substantially continuous passageway extending in a generally continuous forward direction therethrough with an inlet and an outlet, an obstructing wall extending across said passageway between the inlet and the outlet, said casing having an opening above said wall, a flexible diaphragm extending across said opening, a cover for said opening having a fluid receiving chamber above said diaphragm, said wall dividing said passageway into two sections below said diaphragm, an upstream section and a downstream section, and acting to increase the pressure in said upstream section and decrease the pressure in said downstream section when the fluid is flowing normally through the casing, and to increase the pressure in the downstream section and decrease the pressure in the upstream section when the fluid starts to flow through said casing in a reverse direction, and means for automatically utilizing the increased pressure in the downstream section when the fluid starts to flow in a reverse direction through the casing to move said diaphragm to its closed position and shut off the flow of fluid through the casing, said means comprising an opening through said diaphragm at the edge thereof, all of said wall being on one side of said opening.

4. An automatic valve comprising a casing having a substantially continuous passageway extending in a generally continuous forward direction therethrough with an inlet and an outlet, an obstructing wall extending across said passageway between the inlet and the outlet, said casing having an opening above said wall, a flexible diaphragm extending across said opening, a cover for said opening having a fluid receiving chamber above said diaphragm, and an opening through the edge of said diaphragm leading from a point downstream of said wall to the fluid receiving chamber, said diaphragm opening being on the side of the wall nearest the outlet of the casing, the diaphragm being moved out of engagement with said wall by the pressure of the fluid, when the fluid is flowing in a forward direction through said passageway, the diaphragm being moved into engagement with said wall to close said passageway when the fluid starts to flow in a reverse direction, due to the increase in pressure in said fluid receiving chamber caused by this reverse flow of the fluid.

5. An automatic valve comprising a casing having a substantially continuous passageway extending in a generally continuous forward direction therethrough with an inlet and an outlet, an opening intermediate the inlet and outlet, a flexible diaphragm extending across said opening, a seat directly engaged by the diaphragm intermediate the inlet and outlet, a fluid receiving chamber, said diaphragm being between the fluid receiving chamber and the seat and constituting a single separating wall separating said fluid receiving chamber and said passageway, and a fluid connection extending through said diaphragm at a point at one side of and downstream of the seat and connecting said passageway and said fluid receiving chamber.

GEORGE A. ILER.